United States Patent
Dick et al.

(10) Patent No.: US 7,979,539 B2
(45) Date of Patent: *Jul. 12, 2011

(54) SYSTEM, METHOD AND COMPUTER PROGRAM PRODUCT FOR ANALYZING DATA FROM NETWORK-BASED STRUCTURED MESSAGE STREAM

(75) Inventors: Kevin Stewart Dick, Palo Alto, CA (US); Eric Kenneth Rescorla, Palo Alto, CA (US)

(73) Assignee: Network Resonance, Inc., Palo Alto, CA (US)

(*) Notice: Subject to any disclaimer, the term of this patent is extended or adjusted under 35 U.S.C. 154(b) by 162 days.

This patent is subject to a terminal disclaimer.

(21) Appl. No.: 12/260,821

(22) Filed: Oct. 29, 2008

(65) Prior Publication Data

US 2009/0193114 A1 Jul. 30, 2009

Related U.S. Application Data

(63) Continuation of application No. 09/861,281, filed on May 18, 2001, now Pat. No. 7,464,154.

(51) Int. Cl.
*G06F 15/173* (2006.01)
(52) U.S. Cl. ........................................ 709/224
(58) Field of Classification Search ............... 709/224
See application file for complete search history.

(56) References Cited

U.S. PATENT DOCUMENTS

| | | | |
|---|---|---|---|
| 4,625,076 A | 11/1986 | Okamoto et al. | |
| 4,868,877 A | 9/1989 | Fischer | |
| 4,881,264 A | 11/1989 | Merkle | |
| 5,136,646 A | 8/1992 | Haber et al. | |
| 5,136,647 A | 8/1992 | Haber et al. | |
| 5,235,642 A | 8/1993 | Wobber et al. | |
| 5,373,561 A | 12/1994 | Haber et al. | |
| RE34,954 E | 5/1995 | Haber et al. | |
| 5,533,021 A | 7/1996 | Branstad et al. | |
| 5,615,109 A * | 3/1997 | Eder | 705/7.12 |
| 5,640,456 A | 6/1997 | Adams, Jr. et al. | |
| 5,671,364 A | 9/1997 | Turk et al. | |

(Continued)

FOREIGN PATENT DOCUMENTS

EP 0786883 A1 7/1997

(Continued)

OTHER PUBLICATIONS

Páircéir, R. et al. Discovery of multi-level rules and exceptions from a distributed database. Proceedings of the sixth ACM SIGKDD international conference on knowledge discovery and data mining, 2000. pp. 523-532.*

(Continued)

*Primary Examiner* — Wing F Chan
*Assistant Examiner* — Alicia Baturay
(74) *Attorney, Agent, or Firm* — Cooley LLP; Vidya R. Bhakar, Esq.

(57) ABSTRACT

A system, method and computer program product for analyzing data from a message stream, are disclosed. Data in a structured format is captured from a message stream. The captured data is processed to conform to a data model format so that one or more events can be identified from an analysis of the processed data. Once an event has been identified, the message stream is monitored to detect the identified event. When detected, the event is exported via a network.

17 Claims, 5 Drawing Sheets

U.S. PATENT DOCUMENTS

| | | | | |
|---|---|---|---|---|
| 5,691,917 | A * | 11/1997 | Harrison | 717/127 |
| 5,781,629 | A | 7/1998 | Haber et al. | |
| 5,781,729 | A | 7/1998 | Baker et al. | |
| 5,799,016 | A | 8/1998 | Onweller | |
| 5,835,726 | A | 11/1998 | Shwed et al. | |
| 5,878,218 | A | 3/1999 | Maddalozzo et al. | |
| 5,917,911 | A | 6/1999 | Dabbish et al. | |
| 5,925,108 | A * | 7/1999 | Johnson et al. | 719/318 |
| 6,012,098 | A * | 1/2000 | Bayeh et al. | 709/246 |
| 6,021,397 | A * | 2/2000 | Jones et al. | 705/36 R |
| 6,032,193 | A | 2/2000 | Sullivan | |
| 6,067,288 | A | 5/2000 | Miller et al. | |
| 6,075,796 | A | 6/2000 | Katseff | |
| 6,076,071 | A | 6/2000 | Freeny, Jr. et al. | |
| 6,118,936 | A * | 9/2000 | Lauer et al. | 709/224 |
| 6,144,945 | A * | 11/2000 | Garg et al. | 705/28 |
| 6,148,290 | A * | 11/2000 | Dan et al. | 705/304 |
| 6,167,448 | A | 12/2000 | Hemphill et al. | |
| 6,178,244 | B1 | 1/2001 | Takeda et al. | |
| 6,212,190 | B1 | 4/2001 | Mulligan | |
| 6,236,972 | B1 | 5/2001 | Shkedy | |
| 6,246,771 | B1 | 6/2001 | Stanton et al. | |
| 6,314,402 | B1 | 11/2001 | Monaco et al. | |
| 6,351,467 | B1 | 2/2002 | Dillon | |
| 6,363,477 | B1 | 3/2002 | Fletcher et al. | |
| 6,381,344 | B1 | 4/2002 | Smithies et al. | |
| 6,393,102 | B1 * | 5/2002 | Drew et al. | 379/25 |
| 6,401,074 | B1 | 6/2002 | Sleeper | |
| 6,405,179 | B1 * | 6/2002 | Rebane | 705/36 R |
| 6,405,212 | B1 * | 6/2002 | Samu et al. | 1/1 |
| 6,408,404 | B1 * | 6/2002 | Ladwig | 714/39 |
| 6,456,986 | B1 * | 9/2002 | Boardman et al. | 705/400 |
| 6,484,203 | B1 * | 11/2002 | Porras et al. | 709/224 |
| 6,490,292 | B1 | 12/2002 | Matsuzawa | |
| 6,539,392 | B1 * | 3/2003 | Rebane | 705/7.31 |
| 6,643,652 | B2 * | 11/2003 | Helgeson et al. | 1/1 |
| 6,662,192 | B1 * | 12/2003 | Rebane | 1/1 |
| 6,697,809 | B2 * | 2/2004 | Chen et al. | 1/1 |
| 6,711,581 | B2 * | 3/2004 | Rebane | 707/607 |
| 6,714,979 | B1 * | 3/2004 | Brandt et al. | 709/225 |
| 6,724,933 | B1 * | 4/2004 | Lin et al. | 382/164 |
| 6,732,102 | B1 * | 5/2004 | Khandekar | 1/1 |
| 6,732,153 | B1 * | 5/2004 | Jakobson et al. | 709/206 |
| 6,742,119 | B1 | 5/2004 | Peyravian et al. | |
| 6,766,368 | B1 * | 7/2004 | Jakobson et al. | 709/224 |
| 6,772,216 | B1 * | 8/2004 | Ankireddipally et al. | 709/230 |
| 6,785,682 | B2 * | 8/2004 | Todd | 1/1 |
| 6,826,405 | B2 | 11/2004 | Doviak et al. | |
| 6,826,582 | B1 * | 11/2004 | Chatterjee et al. | 1/1 |
| 6,941,557 | B1 * | 9/2005 | Jakobson et al. | 719/316 |
| 7,010,478 | B2 * | 3/2006 | Mathur et al. | 704/9 |
| 7,051,071 | B2 * | 5/2006 | Stewart et al. | 709/204 |
| 7,069,335 | B1 * | 6/2006 | Layman et al. | 709/238 |
| 7,162,448 | B2 | 1/2007 | Madoff et al. | |
| 7,464,154 | B2 * | 12/2008 | Dick et al. | 709/224 |
| 2001/0021252 | A1 | 9/2001 | Carter et al. | |
| 2002/0016964 | A1 | 2/2002 | Aratani et al. | |
| 2002/0023221 | A1 | 2/2002 | Miyazaki et al. | |
| 2002/0032865 | A1 | 3/2002 | Golubchik et al. | |
| 2002/0035606 | A1 | 3/2002 | Kenton | |
| 2002/0056091 | A1 | 5/2002 | Bala | |
| 2002/0072951 | A1 * | 6/2002 | Lee et al. | 705/10 |
| 2002/0078384 | A1 | 6/2002 | Hippelainen | |
| 2002/0080958 | A1 | 6/2002 | Ober et al. | |
| 2002/0091605 | A1 | 7/2002 | Labe et al. | |
| 2002/0120711 | A1 * | 8/2002 | Bantz et al. | 709/217 |
| 2002/0120850 | A1 | 8/2002 | Walker et al. | |
| 2002/0138744 | A1 | 9/2002 | Schleicher et al. | |
| 2002/0174218 | A1 * | 11/2002 | Dick et al. | 709/224 |
| 2002/0174340 | A1 * | 11/2002 | Dick et al. | 713/178 |
| 2003/0021275 | A1 | 1/2003 | Shabeer | |
| 2003/0028468 | A1 | 2/2003 | Wong et al. | |
| 2003/0120939 | A1 | 6/2003 | Hughes et al. | |
| 2003/0126435 | A1 | 7/2003 | Mizell et al. | |
| 2004/0015582 | A1 | 1/2004 | Pruthi | |
| 2006/0053156 | A1 * | 3/2006 | Kaushansky et al. | 707/102 |
| 2009/0193114 | A1 * | 7/2009 | Dick et al. | 709/224 |

FOREIGN PATENT DOCUMENTS

| | | |
|---|---|---|
| GB | 2328043 A | 2/1999 |
| WO | WO 9724841 A3 | 7/1997 |
| WO | WO 0011619 A | 3/2000 |
| WO | WO 0107979 A | 2/2001 |
| WO | WO 0139435 A2 | 5/2001 |

OTHER PUBLICATIONS

Spanos, A. Statistical Foundations of Econometric Modelling. Cambridge University Press. 1986. pp. 7, 8, 18, 90, 131, 462.*

Office Action mailed Mar. 25, 2010 from U.S. Appl. No. 11/379,045.

Arnold, et al., "An approach for the interoperation of web-distributed applications with a design model" Automation in Construction, Elsevier Science Publishers, Amsterdam, NL, vol. 8, No. 3, Feb. 1, 1999, pp. 291-303, XP004161221 ISSN: 0926-5805.

Berners-Lee, et al., "RFC 1866: Hypertext Markup Language—2.0", Nov. 1995.

Chou-Chen Yang et al., Cryptanalysis of Security Enhancement for the Timestamp-based Password Authentication Scheme Using Smart Cards, Consumer Electronics, IEEE Transactions on vol. 50, Issue 2, pp. 578-579, May 2004.

CISCO, "Cisco 3200 Mobile Access Routers", 2 pages, Copyright 1992-2002 Cisco Systems, Inc., URL: www.cisco.com/warp/public/cc/pd/rt/ps272/.

CISCO, "Cisco 3200 Mobile Access Routers Product Literature", 2 pages, Copyright 1992-2002 Cisco Systems, Inc., URL: www.cisco.com/warp/public/cc/pd/rt/ps272/prodlit/index.shtml.

International Search Report from International Application No. PCT/US02/15163 dated Jul. 12, 2002.

Preliminary Examination Report from International Application No. PCT/US02/15163 dated Mar. 27, 2003.

International Search Report from International Application No. PCT/US03/024319 dated Aug. 23, 2004.

Written Opinion from International Application No. PCT/US03/024319 dated Dec. 29, 2005.

Preliminary Examination Report from International Application No. PCT/US03/024319 dated Mar. 22, 2006.

Preliminary Examination Report from International Application No. PCT/US02/15164 dated Feb. 26, 2004.

Dierks, et al., "The TSL Protocol, Version 1.0", Certicom, Jan. 1999, 57 pagesURL: www.ietf.org/rfc/rfc2246.txt.

Geng-Sheng Kuo et al., "Predictable Timestamp Under Synchronized Clocks in a Network", Information Theory, 1994 Proceedings, p. 68, 1994 IEEE International Symposium, Jun. 27-Jul. 1, 1994.

Fielding, et al., "Hypertext Transfer Protocol—HTTP/1.1: HTTP Working Group Internet Draft", May 2, 1986.

Freier, Alan, et al., "The SSL Protocol, Version 3.0," Netscape Communications, Nov. 18, 1996, 47 pages URL: http://wp.netscape.com/eng/ss13/draft302.txt.

Google Search—Definition "at the money".

http://www.aiai.ed.ac.uk/project/akt/work/jessicac/kit/server.pl.html.

http://www.javaworld.com/javaworld/jw-03-2000/jw-0331-ssj-jspxml13p.html.

Microsoft, Web Services Security Addendum, Version 1.0, Aug. 2002.

Pei-Yih Ting, "A Temporal Order Resolution Algorithm in the Multi-Server Time Stamp Service Framework", Advanced Information Networking and Applications, AINA 2005, 19th Conference on vol. 2, pp. 445-448, Mar. 28-30, 2005.

PTI Trader's Glossary-A, Internet Waybackmachine, Apr. 26, 2001.

W3C, Simple Object Access Protocol (SOAP) 1.1, May 2000.

Office Action dated May 12, 2006 from Utility Patent No. 7451110.

Office Action dated Dec. 18, 2006 from Utility Patent No. 7451110.

Office Action dated Sep. 7, 2007 from Utility Patent No. 7451110.

Office Action dated Oct. 6, 2004 from Utility Patent No. 7124299.

Office Action dated Oct. 19, 2005 from Utility Patent No. 7124299.

Office Action dated Apr. 22, 2005 from Utility Patent No. 7124299.

Office Action dated Mar. 17, 2009 from Continuation Patent Application No. 11549880.

Office Action dated Sep. 10, 2004 from Utility Patent No. 7039034.

Office Action dated May 24, 2005 from Utility Patent No. 7039034.

Office Action dated Oct. 30, 2008 from Continuation-in-Part Patent Application No. 11379045.
Office Action dated Aug. 6, 2009 from Continuation-in-Part Patent Application No. 11379045.
Office Action dated Feb. 24, 2004 from Utility Patent No. 6874089.
Office Action dated Oct. 6, 2004 from Utility Patent No. 6874089.
Office Action dated Jun. 24, 2008 from Continuation Patent Application No. 10977399.
Office Action dated Mar. 17, 2009 from Continuation Patent Application No. 10977399.
Office Action dated Jul. 22, 2008 from Continuation-in-Part Patent Application No. 11059908.
Office Action dated Apr. 1, 2009 from Continuation-in-Part Patent Application No. 11059908.
Office Action dated Nov. 2, 2004 from Utility Patent No. 7464154.
Office Action dated Jun. 2, 2005 from Utility Patent No. 7464154.
Office Action dated Jan. 18, 2006 from Utility Patent No. 7464154.
Office Action dated Sep. 13, 2006 from Utility Patent No. 7464154.
Office Action dated May 21, 2007 from Utility Patent No. 7464154.
Office Action dated Feb. 2, 2009 from Canadian Patent Application No. 2,446,753.
Office Action dated Jan. 4, 2007 from Indian Patent Application No. 487/DELNP/2005.
Office Action dated Jun. 2, 2009 from Israel Patent Application No. 166660.
Supplemental Search Report dated Jun. 2, 2009 from European Patent Application No. 02729199.6.
Office Action dated Oct. 9, 2008 from European Patent Application No. 02771835.2.
Gray at al., "Data Cube: A Relational Aggregation Operator Generalizing Group By, Cross Tab, and Sub-Totals", Data Engineering, 1996, pp. 152-159.
Pairceir at al., "Discovery of Multi-Level Rules and Exceptions From a Distributed Database", Proceedings of the sixth ACM SIGKDD International Conference on Knowledge Discovery and Data Mining, 2000, pp. 523-532.
Spanos, "Statistical Foundations of Econometric Modelling", Cambridge University Press, 1986, pp. 7, 8, 18, 190, 131, 462.
Office action from Israel Application No. 158911.
International Search Report from International Application No. PCT/US02/15164 dated Jul. 12, 2002.
Vasudevan, A Web Services Primer, Apr. 4, 2001, XML.com, p. 3.
Final Office Action mailed Dec. 14, 2009 from U.S. Appl. No. 11/549,880.
Final Office Action mailed Jan. 6, 2010 from U.S. Appl. No. 11/059,908.

* cited by examiner

SYSTEM, METHOD AND COMPUTER PROGRAM PRODUCT FOR ANALYZING DATA FROM NETWORK-BASED STRUCTURED MESSAGE STREAM

CROSS REFERENCE TO RELATED APPLICATIONS

This application is a continuation of prior U.S. application Ser. No. 09/861,281, filed May 18, 2001, which is hereby incorporated by reference herein in its entirety.

FIELD OF THE INVENTION

This invention relates to data warehousing and business intelligence, and more particularly, relates to analyzing data in a message stream.

BACKGROUND OF THE INVENTION

Enterprises clearly want to leverage the vast amount of electronic data they process in conducting their businesses to understand the nature of these businesses. A purpose of data warehousing is to take operational data and turn it into analyzable data. There are three primary problems with this approach. First, the remote procedure call model used in client-server systems and the normalized data model used in relational databases tends to strip out much of the semantic information that would be useful in linking data elements together for analysis. Second, operational data lies in so many different data stores that it is difficult to marshal all the relevant data in a single location. Third, because operational data migrates to data warehouses over time, the resulting analysis cannot detect important events as they are occurring.

The rise of extensible markup language (XML) messaging as a primary means for 30 business-to-business (B2B) commerce offers an alternative solution. With B2B XML messaging, enterprises may conduct their businesses electronically by sending XML business messages over the Internet to their business partners. These messages tend to be semantically meaningful and self describing, addressing the first problem with data warehousing. While many different applications may process these messages for a given enterprise, they all have to pass through the boundary between the public Internet and the enterprise's private network, yielding a potential single point of data collection that would address the second problem with data warehousing. Moreover, enterprises can also perform real-time analysis of incoming operational messages at this same point, overcoming the third problem with data warehousing.

The barriers to performing this type of analysis on the operational XML message stream are significant and include:
  Detecting XML messages of interest among all network traffic without impacting other network components.
  Extracting XML data from a variety of underlying transports (e.g., HTTP, JMS, MQSeries), packaging approaches (e.g., MIME), and XML application protocols (e.g., BizTalk, ebXML, RosettaNet).
  Maintaining the semantic relationships among elements in the same messages and among different messages.
  Applying a variety of different statistical analysis techniques to the same data under different conditions and for different purposes.
  Providing great enough throughput under high message loads.

SUMMARY OF THE INVENTION

A system, method and computer program product for analyzing data from a message stream are disclosed. Data in a structured message format is captured from a message stream. The captured data is processed to conform to a data model format so that one or more events can be identified from an analysis of the processed data. Once an event has been identified, the message stream is monitored to detect the identified event. When detected, the event is exported via a network.

In an embodiment of the present invention, the structured message format may be extensible markup language. In one aspect of the present invention, the data model format may comprise a data cube. In an embodiment of the present invention, events, may include local events derived from examining individual messages in the message stream and global events derived from examining multiple messages in the message stream. Local events may be detected in real time as soon as processing of the individual message completes. Global events may be detected asynchronously as soon as the processing of the last message completes.

In one embodiment of the present invention, a user may be permitted to select at least one of the identified events for detection in the message stream. In another embodiment; dynamically loadable analytic modules may be provided for analyzing the processed data. In a further embodiment, a user may be permitted to select at least one location connected to the network to which the detected event is exported.

In another aspect of the present invention, the captured data may be stored in a data store. In a further aspect, some or all of the detected events may be exported via the network utilizing a publish-subscribe interface. In an additional aspect, a network device may be utilizing to collect the data from the message stream. In even another aspect, the events may include a changing business conditions event.

DETAILED DESCRIPTION

Figure 1:
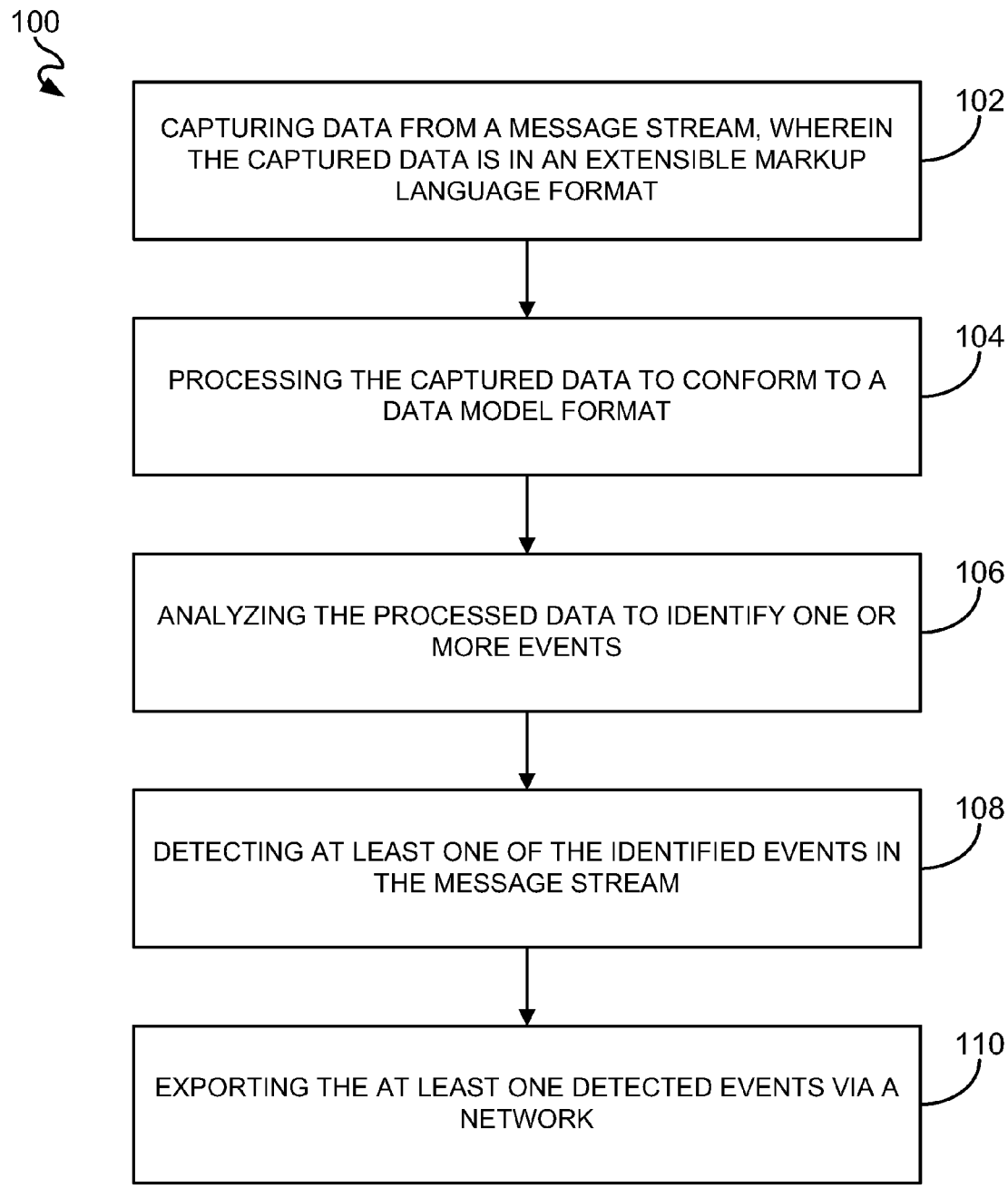
FIG. 1 is a flowchart of a process for analyzing operational data from a network-based message stream in accordance with an embodiment of the present invention.

FIG. 1 is a flowchart of a process 100 for analyzing operational data from a network-based message stream in accordance with an embodiment of the present invention.

Incoming operational data in a structured message format (such as, for example, XML messages) is captured from a network-based message stream in operation 102. The captured data is processed in operation 104 to conform to a data model format so that one or more events can be identified from an analysis of the processed data in operation 106. Once an event has been identified, the incoming data of the message stream is monitored to detect the identified event in operation 108. When detected, the event is exported via a network in operation 110.

In one aspect of the present invention, the data model format into which the captured data is processed may comprise a data cube of at least two dimensions. In an embodiment of the present invention, events may include local events derived from examining individual messages in the message stream and global events derived from examining multiple messages in the message stream. Local events may be detected in real time as they are captured while global events may be detected asynchronously as the last message to trigger the event is captured.

In one embodiment of the present invention, a user may be permitted to select via the network at least one of the identified events for detection in the incoming data of the message stream. In another embodiment, dynamically loadable analytic modules may be provided for analyzing the processed data. In a further embodiment, a user may be permitted to select at least one location connected to the network to which the detected event is exported.

In another aspect of the present invention, the captured data may be stored in a data store. In a further aspect, some or all of the detected events may be exported via the network utilizing a publish-subscribe interface. In an additional aspect, a network device may be utilized to collect the data from the message stream. In even another aspect, the events may include a changing business conditions event.

In accordance with the process set forth in FIG. 1, there are a number of potential approaches for analyzing the operational XML message stream. Choosing from among these approaches requires an understanding of the complete process for this analysis:

1. Capture the data from the XML messaging stream. The capture step must maximize the captured percentage of the total volume of XML data exchanged between an enterprise and its trading partners.
2. Process the captured data into a usable structure. This structure must maximize the retention of semantic relationships explicitly or implicitly encoded in the captured XML message stream.
3. Analyze the processed data for patterns. This analysis must maximize the number of analytical techniques applicable to the processed XML data.
4. Detect incoming messages of particular business interest based on the analytical results.
5. Export processed data, analytical results, and detected events to other systems.

Maximizing the captured percentage of XML data and detecting incoming messages of interest argues for pushing the point of XML message capture as close to the edge of the enterprise network as possible. There are relatively few entry points into the enterprise network, while there are potentially a large number of XML message routing servers that will handle these messages and potentially a very large number of applications that will eventually receive these messages. Therefore, performing XML message capture at the edge of the enterprise network is the least intrusive on the enterprise computing architecture. Because enterprises do not typically allow the installation of application software at the edge of enterprise network, a network device must perform the capture of XML messages and detection of interesting messages.

Maximizing the retention of semantic relationships during message processing argues for the optional separation of capture and processing components. A small enterprise may have only one entry point into its network and low enough message volume that a single capture device can serve the load. In this case, the capture and processing components may execute on the same network device without loss of generality. However, a large enterprise may have several entry points into its network and the message volume at each entry point may require a cluster of capture devices to serve the load. In this case, each capture device only has access to the fraction of messages it captures, while these messages may have semantic relationships with messages captured by other devices. Therefore, to serve the needs of large enterprises, the capture and processing components must be separable. To accomplish this efficiently, the processing step itself should have two distinct phases. A pre-processing phase would encode message data into a standard data structure, including those semantic relationships limited to the scope of that particular message. The capture component would execute the pre-processing phase. A joining phase would transform the collection of pre-processed data structures into a master data structure that encoded the semantic relationships among messages and provided a single point of access for the analysis step. The processing component would execute the joining phase. Because the processing component must receive large amounts of data from all the capture components, the processing component should reside as close as possible to the collection of capture components, arguing that it should be a network device as well.

Providing immediate results to enterprises argues for some basic set of analytic techniques executing directly on the processing device (which may in small installations also be the capture device). Maximizing the number of available analytical techniques argues for providing for dynamically loadable analytic modules on the processing device and providing a remote data access API accessible to a variety of analytic software packages. Exporting the processed data also argues for providing a remote data access interface on the process device.

Because the described artifact will constantly analyze the incoming message stream, there is an opportunity for a whole new class of event detection—changing business conditions. One member of the basic set of analytic techniques would be probability density function approximation. The basic idea is to create an approximation of the actual distribution of values for an important business variable with a parametrically described probability density function. If the processing device recalculates these density functions on a daily, weekly, or monthly basis, it will detect a variation in the parametric values of the approximation. If these values change consistently in one direction, it may be a signal of fundamental changes in the business conditions. For example, say the distribution of dollar value for individual orders approximates a normal distribution. The mean and variance remain relatively constant over a year, but then over a few months the mean steadily shifts upwards and the variance steadily shifts downwards. This could indicate a trend towards consolidation among customer companies. With the smaller companies being acquired or put out of business, the average customer would grow larger but they would all be more similarly sized. Such a trend could have a major impact on sales and marketing channels. Performing this analysis for dozens or even hundred of key variables could give an enterprise unprecedented warning of business change and the understanding necessary to take advantage of that change.

As discussed above, there are two components to the solution, capture and processing. The capture component is a network device. The processing component can be deployed as either a network device or a software stack. Network devices may comprise a standard PC hardware in a 19" rack mount form factor for easy deployment to enterprise data centers. These devices may run on a freely available, widely ported operating system like NetBSD, yielding the a dual advantages of a large library of software utilities written for the platform and the ability to select the most cost effective hardware architecture. Capture devices have two Ethernet ports so it can sniff packets, while the processing device requires only a single Ethernet port. The capture device must run behind the SSL accelerator layer used by most enterprises to ensure maximal acquisition of SSL encoded B2B messages. The processing device may run anywhere on the internal enterprise network.

Figure 2:
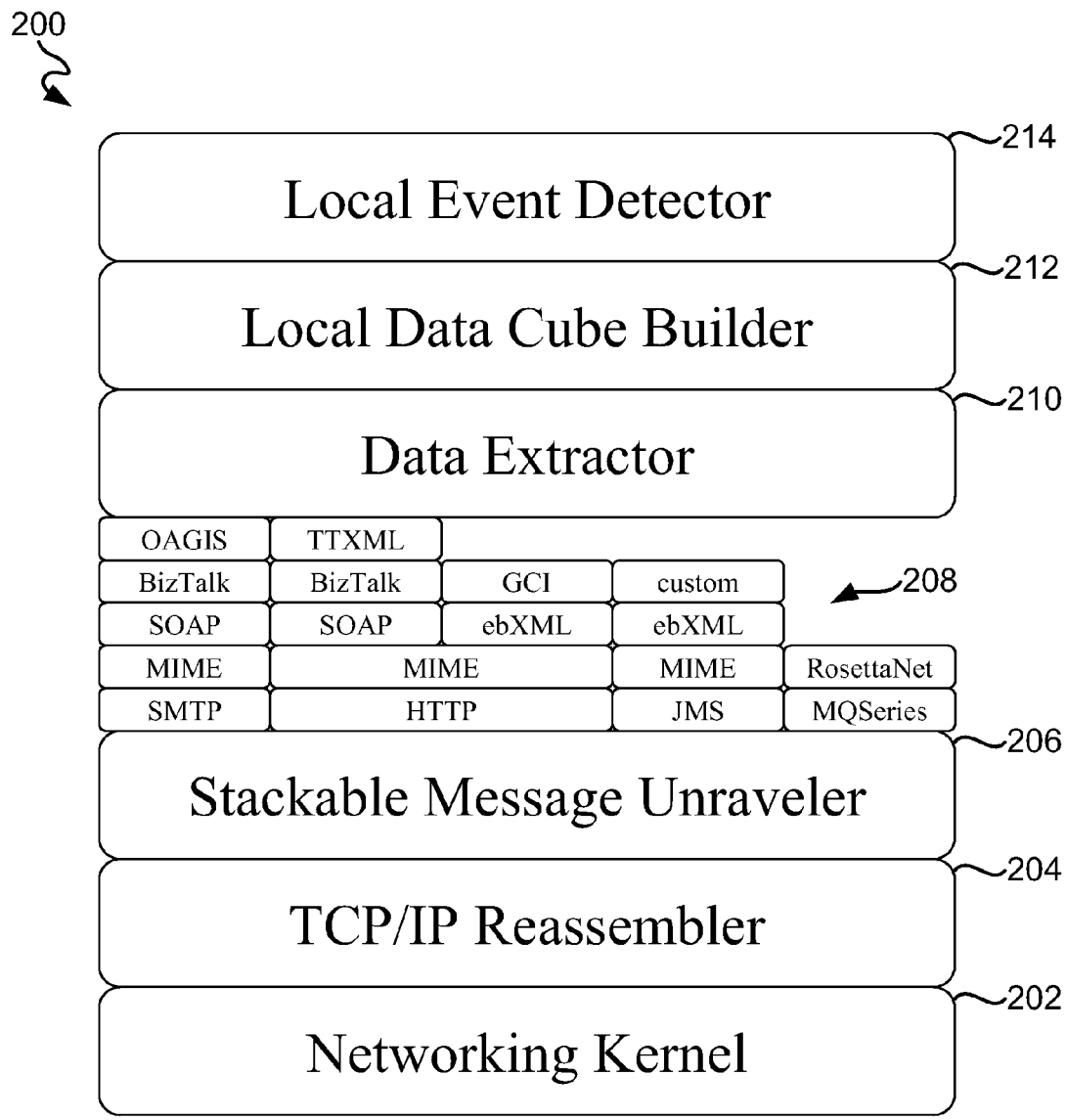
FIG. 2 is a schematic diagram of a capture device software stack in accordance with an embodiment of the present invention.

FIG. 2 shows a software stack of a capture device 200 in accordance with an embodiment of the present invention. The lowest level function is the capture of network packets. For low-load situations, it can use the Berkeley Packet Filter (BPF) to capture all Ethernet traffic and reassemble it in user space. For high load situations, an enhanced operating system kernel 202 may be utilized. The modification to the kernel allows a socket option that suppresses the output functions. As far as the application is concerned, the kernel 202 accepts connections on a given socket but it never transmits. The application then issues read, but not write, commands on the socket to read the application data. In either case, the capture device needs to reassemble the captured TCP packets into application level messages utilizing a TCP/IP reassembler 204.

Once it has application level messages, the capture device 200 must figure out if they contain B2B XML messages. Because these messages may flow over many application level transports, use many different packaging standards, and use many different XML message protocols, etc., getting at this data requires a stackable message unraveler 206. For each potential combination of layers with an XML message at the top, the capture device has a registered stack of pluggable unravelers 208. As illustrated in FIG. 2, some examples of pluggable unravelers 208 that may be plugged into the stack include: an OAGIS pluggable unraveler, a BizTalk pluggable unraveler, a SOAP pluggable unraveler, a MIME pluggable unraveler, a SMTP pluggable unraveler, a TTXML pluggable unraveler, a GCI pluggable unraveler, an ebXML pluggable unraveler, a JMS pluggable unraveler, a RosettaNet pluggable unraveler, a MQSeries pluggable unraveler, as well as customizable pluggable unravelers.

In operation, as messages come in from the TCP reassembler 204, the unraveling framework 206 and 208 examines the application header to see if it supports that header. It then examines the next level of header and proceeds in this manner until it either finds an unrecognized header or finds the top-level XML message, which it passes on to the data extractor. Because the headers may have relevant information in and of themselves, each pluggable unraveler in the stack 208 is configured to capture some of the header information at each level and pass that on as well.

A data extractor 210 detects the type of the XML message and builds a data cube with a configurable number of axes using a local data cube builder 212. At a minimum this cube has two dimensions that capture whether two elements in the message have a semantic relationship. It may have additional axes such as the path of element types from an XML schema or the XML namespace. At this point, the capture device 200 detects any local events using a local event detector 214 and sends the local data cube to the processing device.

There are two types of events in the system, local events and global events. Local events are those that can be detected from the content of a single message such as, for example, an Order where the Customer Region is Southern United Sates and the Total is greater than $1 M. The capture device 200 can capture these events in near real time. Global events are those that can be detected only by examining the content of multiple messages such as, for example, Orders by Customers that have sent an more than three Counter Offers preceding the Order. Because these events include data from multiple messages, the processing device must capture them asynchronously, after processing the last message. Once detected (such as, for example, by a global event handler of the processing device), both types of events are sent to the processing device's event handler for dispatch.

Figure 3:
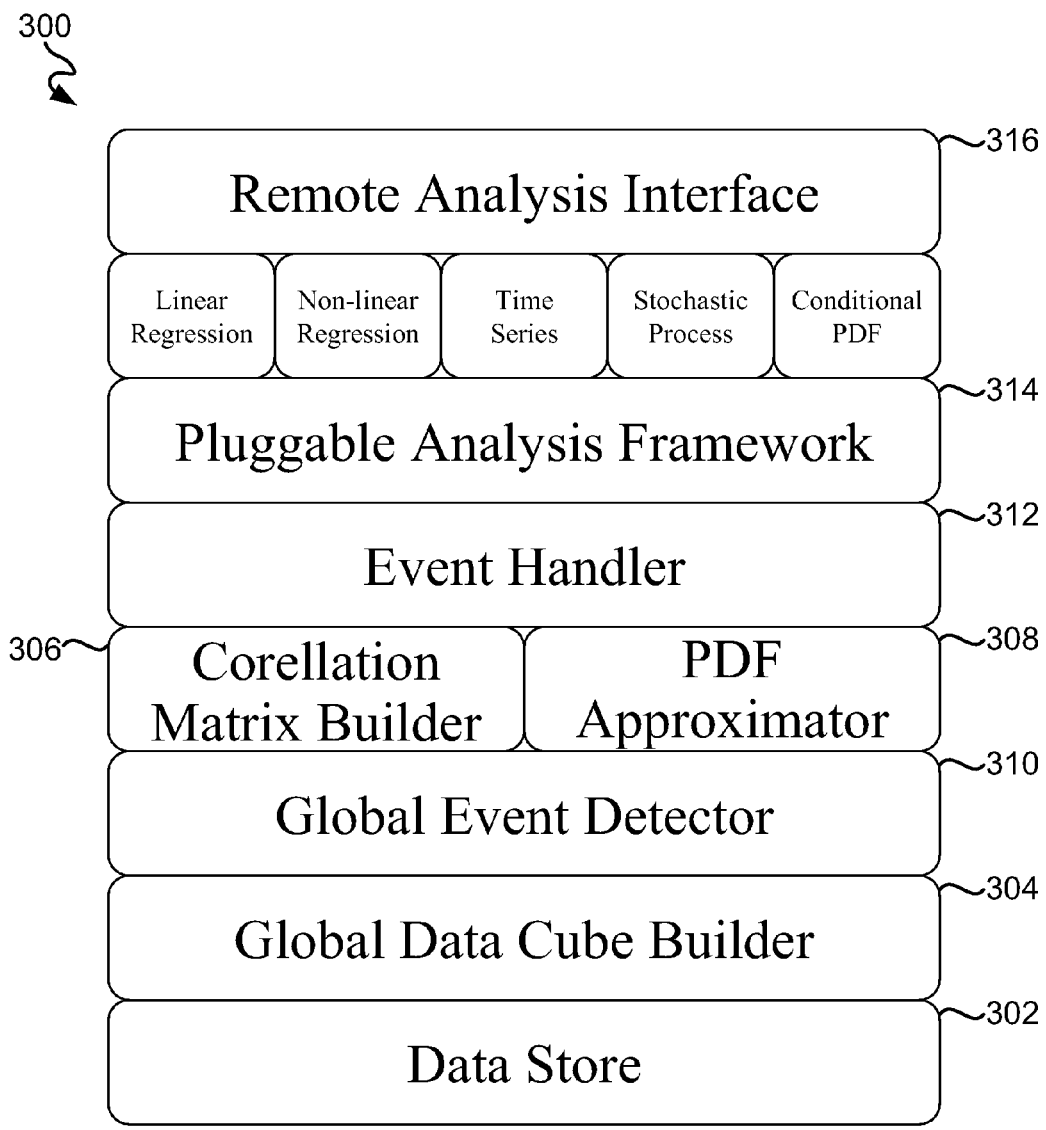
FIG. 3 is a schematic diagram of a processing device software stack in accordance with 10 an embodiment of the present invention.

FIG. 3 shows a software stack of a processing device 300 in accordance with an embodiment of the present invention. The lowest level function is a data store 302 that contains an archive of all data received from capture devices. This can be either a reliable file system or a database management system. As this data comes in, a global data cube builder 304 takes the local data cubes from the capture devices and aggregates them. It specifies a new dimension of time and adds indications of semantic relationships among elements in different messages based on either analysis of the message headers or business rules.

With all the information from all the messages, the processing device 300 performs two analysis functions. First, it performs a dependency analysis on all the variables in the matrix utilizing a dependency matrix builder 306. It chooses the variable to analyze based on the semantic relationships. These relationships may be specified in the message format itself or externally provided business rules. It does not simply analyze dependencies between variables that have direct semantic relationships, but rather traverses a configurable number of hops. This analysis provides both valuable data on the structure of the business and hints to downstream analytic components on what independent variable to use. The dependency analysis may use a number of statistical techniques to detect whether there is a dependency between two variables. Such techniques include correlation and analysis of variance. Second the processing device uses a PDF approximator 308 to build an approximation of an analytic PDF. It can use any PDF approximation technique, such as the generalized lambda function. The global event detector 310, as discussed previously, then looks for events that require the analysis, of multiple messages. In a preferred embodiment, this event detection needs to happen after the previous steps so these events can include shifts in correlation coefficients or PDF parameters.

All events, whether local or global, come into an event handler 312. A user, such as business analyst, describes a type of event based on historical findings provided by the system. Through a remote interface, the user registers this event type with the event handler 312. The user describes what conditions make the event true and where the processing device 300 should send the event. The processing device can support any publish-subscribe protocol such as the Java Messaging Service, Microsoft Message Queuing, or IBM MQSeries. Once registered, the event handler 312 determines whether it is a local or global event type and delegates the detection responsibility to the appropriate component. When an event comes in during execution, the event handler 312 logs the event and then puts it into the specified publish-subscribe system.

Finally, a pluggable analysis framework 314 dispatches the various types of analysis configured for execution on the processing device. One of the events the event handler can accept is dispatch to a particular analysis technique. The software for this technique is installed in the processing device at deployment time. Any technique that can be reduced to C software code is possible. As illustrated in FIG. 3, some illustrative analysis technique plug-ins that may be plugged into the pluggable analysis framework 314 may include: a linear regression analysis plug-in, a non-linear regression analysis plug-in, a time series analysis plug-in, a Stochastic process analysis plug-in, and a conditional PDF analysis plug-in. Once the locally executed analyses finish, the original data and the results of these techniques becomes available to external software through the remote analysis interface 316.

Figure 4:
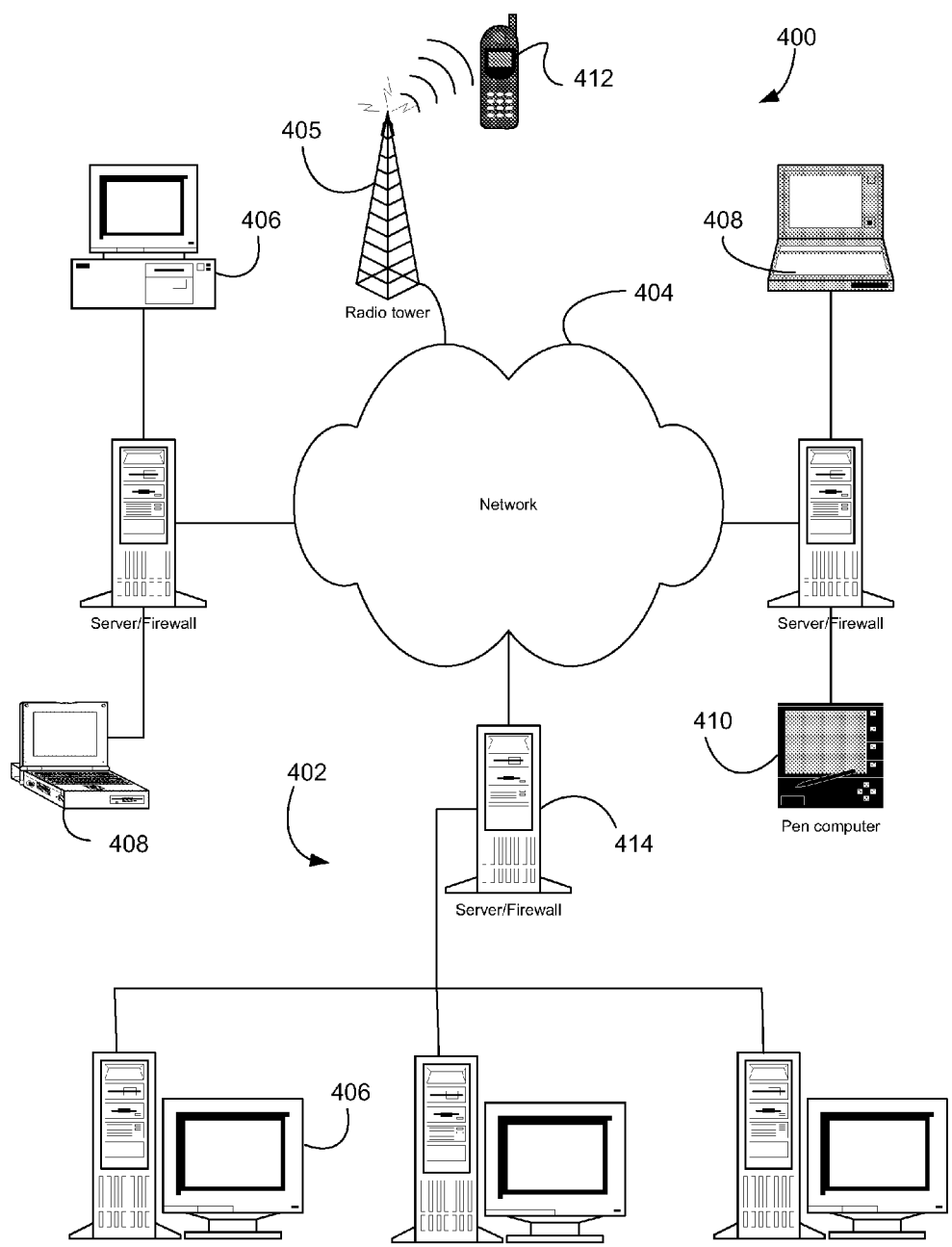
FIG. 4 is a schematic diagram of an illustrative system with a plurality of components in accordance with an embodiment of the present invention.

FIG. 4 illustrates an exemplary system 400 with a plurality of components 402 in accordance with one embodiment of the present invention. As shown, such components include a network 404 which take any form including, but not limited to a local area network, a wide area network such as the Internet, and a wireless network 405. Coupled to the network 404 is a plurality of computers which may take the form of desktop computers 406, lap-top computers 408, hand-held computers 410 (including wireless devices 412 such as wireless PDA's or mobile phones), or any other type of computing hardware/ software. As an option, the various computers may be connected to the network 404 by way of a server 414 which may be equipped with a firewall for security purposes. It should be noted that any other type of hardware or software may be included in the system and be considered a component thereof.

Figure 5:
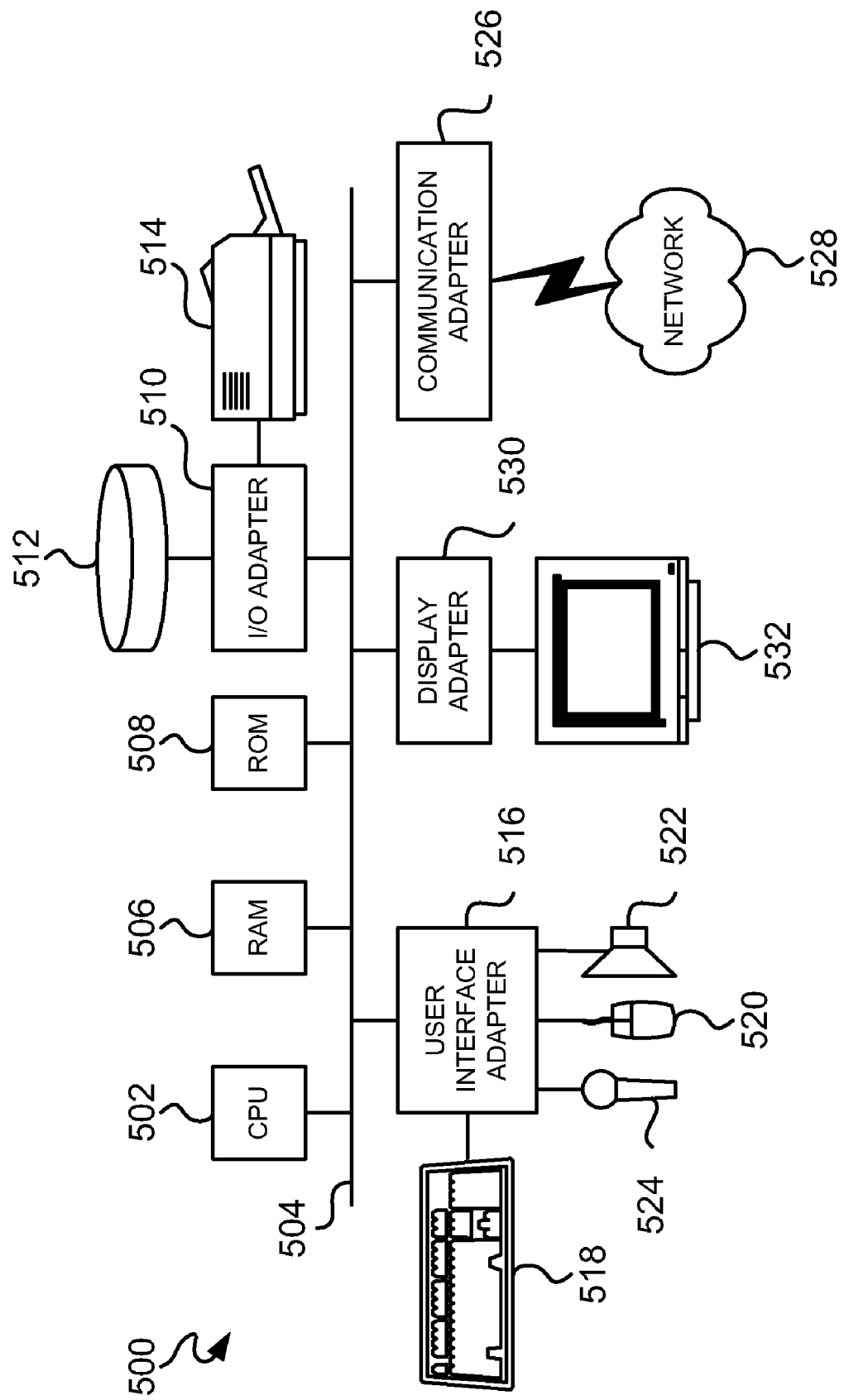
FIG. 5 is a schematic diagram of a representative hardware environment in accordance with an embodiment of the present invention.

A representative hardware environment associated with the various components of FIG. 4 is depicted in FIG. 5, In the present description, the various sub-components of each of the components may also be considered components of the system. For example, particular software modules executed on any component of the system may also be considered components of the system. FIG. 5 illustrates an illustrative hardware configuration of a workstation 500 having a central processing unit 502, such as a microprocessor, and a number of other units interconnected via a system bus 504.

The workstation shown in FIG. 5 includes a Random Access Memory (RAM) 506, 30 Read Only Memory (ROM) 508, an 110 adapter 510 for connecting peripheral devices such as, for example, disk storage units 512 and printers 514 to the bus 504, a user interface adapter 516 for connecting various user interface devices such as, for example, a keyboard 518, a mouse 520, a speaker 522, a microphone 524, and/or other user interface devices such as a touch screen or a digital camera to the bus 504, a communication adapter 526 for connecting the workstation 500 to a communication network 528 (e.g., a data processing network) and a display adapter 530 for connecting the bus 504 to a display device 532.

Also, an article of manufacture, such as a pre-recorded disk or other similar computer program product, for use with a data processing system, could include a storage medium and program means recorded thereon for directing the data processing system to facilitate the practice of the invention. Such apparatus and articles of manufacture also fall within the spirit and scope of the invention.

A data warehouse is a central repository for all or significant parts of the data that an enterprise's various business systems collect. The term was coined by W. H. Inmon. IBM sometimes uses the term "information warehouse". Typically, a data warehouse is housed on an enterprise mainframe server. Data from various online transaction processing (OTP) applications and other sources is selectively extracted and organized on the data warehouse database for use by analytical applications and user queries. Data warehousing emphasizes the capture of data from diverse sources for useful analysis and access, but does not generally start from the point-of-view of the end user or knowledge worker who may need access to specialized, sometimes local databases. The latter idea is known as the data mart.

A data store may be defined as a table, view, or file that is registered in your data warehousing solution.

A data model may be defined as a collection of business rules that specify the meaning of data and how that data is used. A data cube is a multidimensional data mode that contains at each point an aggregate value, i.e., the result of applying an aggregate function to an underlying relation. The data cube model is described, for example, by J. Gray et al. in "Data Cube: A Relational Aggregate Operator Generalizing Group-bys, Cross-tabs and Sub-totals," Proc. of the 12th Intl Conti On Data Engineering, pp. 152-159, 1996.

Transmission Control Protocol/Internet Protocol (TCP/IP) is a basic communication language or protocol of the Internet. It can also be used as a communications protocol in the private networks called intranet and in extranet. When you are set up with direct access to the Internet, your computer is provided with a copy of the TCP/IP program just as every other computer that you may send messages to or get information from also has a copy of TCP/IP.

TCP/IP is a two-layering program. The higher layer, Transmission Control Protocol (TCP), manages the assembling of a message or file into smaller packet that are transmitted over the Internet and received by a TCP layer that reassembles the packets into the original message. The lower layer, Internet Protocol (P), handles the address part of each packet so that it gets to the right destination. Each gateway computer on the network checks this address to see where to forward the message. Even though some packets from the same message are routed differently than others, they'll be reassembled at the destination.

TCP/IP uses a client/server model of communication in which a computer user (a client) requests and is provided a service (such as sending a Web page) by another computer (a server) in the network. TCP/IP communication is primarily point-to-point, meaning each communication is from one point (or host computer) in the network to another point or host computer. TCP/IP and the higher-level applications that use it are collectively said to be "stateless" because each client request is considered a new request unrelated to any previous one (unlike ordinary phone conversations that require a dedicated connection for the call duration). Being stateless frees network paths so that everyone can use them continuously. (Note that the TCP layer itself is not stateless as far as any one message is concerned. Its connection remains in place until all packets in a message have been received).

Many Internet users are familiar with the even higher layer application protocols that use TCP/IP to get to the Internet. These include the World Wide Web's Hypertext Transfer Protocol (HTTP), the File Transfer Protocol (FTP), Telnet which lets you logon to remote computers, and the Simple Mail Transfer Protocol (SMTP). These and other protocols are often packaged together with TCP/IP as a "suite".

Personal computer users usually get to the Internet through the Serial Line Internet Protocol (SLIP) or the Point-to-Point Protocol. These protocols encapsulate the EP packets so that they can be sent over a dial-up phone connection to an access provider's modem.

Protocols related to TCP/IP include the User Datagram Protocol (UDP), which is used instead of TCP for special purposes. Other protocols are used by network host computers for exchanging router information. These include the Internet Control Message Protocol (ICMP), the Interior Gateway Protocol (IGP), the Exterior Gateway Protocol (EGP), and the Border Gateway Protocol (BGP).

Internetwork Packet Exchange (IPX) is a networking protocol from Novell that interconnects networks that use Novell's NetWare clients and servers. IPX is a datagram or packet protocol. IPX works at the network layer of communication protocols and is connectionless (that is, it doesn't require that a connection be maintained during an exchange of packets as, for example, a regular voice phone call does).

Packet acknowledgment is managed by another Novell protocol, the Sequenced Packet Exchange (SPX). Other related Novell NetWare protocols are: the Routing Information Protocol (RIP), the Service Advertising Protocol (SAP), and the NetWare Link Services Protocol (NLSP).

A virtual private network (VPN) is a private data network that makes use of the public telecommunication infrastructure, maintaining privacy through the use of a tunneling protocol and security procedures. A virtual private network can be contrasted with a system of owned or leased lines that can only be used by one company. The idea of the VPN is to give the company the same capabilities at much lower cost by using the shared public infrastructure rather than a private one. Phone companies have provided secure shared resources for voice messages. A virtual private network makes it possible to have the same secure sharing of public resources for data.

Using a virtual private network involves encryption data before sending it through the public network and decrypting it at the receiving end. An additional level of security involves encrypting not only the data but also the originating and receiving network addresses. Microsoft, 3Com, and several other companies have developed the Point-to-Point Tunneling Protocol (PPP) and Microsoft has extended Windows NT to support it. VPN software is typically installed as part of a company's firewall server.

XML (Extensible Markup Language) is a flexible way to create common information formats and share both the format and the data on the World Wide Web, intranets, and elsewhere. For example, computer makers might agree on a standard or common way to describe the information about a computer product (processor speed, memory size, and so forth) and then describe the product information format with XML. Such a standard way of describing data would enable a user to send an intelligent agent (a program) to each computer maker's Web site, gather data, and then make a valid comparison. XML can be used by any individual or group of individuals or companies that wants to share information in a consistent way.

XML, a formal recommendation from the World Wide Web Consortium (W3C), is similar to the language of today's Web pages, the Hypertext Markup Language (HTML). Both XML and HTML contain markup symbols to describe the contents of a page or file. HTML, however, describes the content of a Web page (mainly text and graphic images) only in terms of how it is to be displayed and interacted with. For example, the letter "p" placed within markup tags starts a new paragraph. XML describes the content in terms of what data is being described. For example, the word "phonenum" placed within markup tags could indicate that the data that followed was a phone number. This means that an XML file can be processed purely as data by a program or it can be stored with similar data on another computer or, like an HTML file, that it can be displayed. For example, depending on how the application in the receiving computer wanted to handle the phone number, it could be stored, displayed, or dialed.

XML is "extensible" because, unlike HTML, the markup symbols are unlimited and self-defining. XML is actually a simpler and easier-to-use subset of the Standard Generalized Markup Language (SGML), the standard for how to create a document structure. It is expected that HTML and XML will be used together in many Web applications. XML markup, for example, may appear within an HTML page.

Early applications of XML include Microsoft's Channel Definition Format (CDF), which describes a channel, a portion of a Web site that has been downloaded to your hard disk and is then is updated periodically as information changes. A specific CDF file contains data that specifies an initial Web page and how frequently it is updated. Another early application is ChartWare, which uses XML as a way to describe medical charts so that they can be shared by doctors. Applications related to banking, e-commerce ordering, personal preference profiles, purchase orders, litigation documents, part lists, and many others are anticipated.

On the Internet, B2B (business-to-business), also known as e-biz, is the exchange of products, services, or information between businesses rather than between businesses and consumers.

Encryption is the conversion of data into a form, called a ciphertext, that cannot be easily understood by unauthorized people. Decryption is the process of converting encrypted data back into its original fowl, so it can be understood.

The use of encryption/decryption is as old as the art of communication. In wartime, a cipher, often incorrectly called a "code," can be employed to keep, the enemy from obtaining the contents of transmissions (technically, a code is a means of representing a signal without the intent of keeping it secret; examples are Morse code and ASCII). Simple ciphers include the substitution of letters for numbers, the rotation of letters in the alphabet, and the "scrambling" of voice signals by inverting the sideband frequencies. More complex ciphers work according to sophisticated computer algorithm that rearrange the data bits in digital signals.

In order to easily recover the contents of an encrypted signal, the correct decryption key is required. The key is an algorithm that "undoes" the work of the encryption algorithm. Alternatively, a computer can be used in an attempt to "break" the cipher. The more complex the encryption algorithm, the more difficult it becomes to eavesdrop on the communications without access to the key.

Rivest-Shamir-Adleman (RSA) is an Internet encryption and authentication system that uses an algorithm developed in 1977 by Ron Rivest, Adi Shamir, and Leonard Adleman. The RSA algorithm is a commonly used encryption and authentication algorithm and is included as part of the Web browser from Netscape and Microsoft. It's also part of Lotus Notes, Intuit's Quicken, and many other products. The encryption system is owned by RSA Security.

The RSA algorithm involves multiplying two large prime numbers (a prime number is a number divisible only by that number and 1) and through additional operations deriving a set of two numbers that constitutes the public key and another set that is the private key. Once the keys have been developed, the original prime numbers are no longer important and can be discarded. Both the public and the private keys are needed for encryption/decryption but only the owner of a private key ever needs to know it. Using the RSA system, the private key never needs to be sent across the Internet.

The private key is used to decrypt text that has been encrypted with the public key. Thus, if I send you a message, I can find out your public key (but not your private key) from a central administrator and encrypt a message to you using your public key. When you receive it, you decrypt it with your private key. In addition to encrypting messages (which ensures privacy), you can authenticate yourself to me (so I know that it is really you who sent the message) by using your private key to encrypt a digital certificate. When I receive it, I can use your public key to decrypt it.

Secure Sockets Layer (SSL) is a commonly-used protocol for managing the security of a message transmission on the Internet. SSL uses a program layer located between the Internet's Hypertext Transfer Protocol (HTTP) and Transport Control Protocol (TCP) layers. The "sockets" part of the term refers to the sockets method of passing data back and forth between a client and a server program in a network or between program layers in the same computer. SSL uses the public-and-private key encryption system from RSA, which also includes the use of a digital certificate.

BizTalk is an industry initiative headed by Microsoft to promote Extensible Markup Language (XML) as the common data exchange language for e-commerce and application integration on the Internet. While not a standards body per se, the group is fostering a common XML message-passing architecture to tie systems together. BizTalk says that the growth of e-commerce requires businesses using different computer technologies to have a means to share data. Accepting XML as a platform-neutral way to represent data transmitted between computers, the BizTalk group provides guidelines, referred to as the BizTalk Framework, for how to publish schema (standard data structures) in XML and how to use XML messages to integrate software programs.

Simple Object Access Protocol (SOAP) is a way for a program running in one kind of operating system to communicate with a program in the same or another kind of an operating system by using the World Wide Web's Hypertext Transfer Protocol and its Extensible Markup Language (XML) as the mechanisms for information exchange. Since Web protocol are installed and available for use by all major operating system platforms, HTTP and XML provide an already at-hand solution to the problem of how programs running under different operating systems in a network can communicate with each other. SOAP specifies exactly how to encode an HTTP header and an XML file so that a program in one computer can call a program in another computer and pass it information. It also specifies how the called program can return a response.

SOAP was developed by Microsoft, DevelopMentor, and Userland Software and has been proposed as a standard interface to the Internet Engineering Task Force (IETF). It is somewhat similar to the Internet Inter-ORB Protocol, a protocol that is part of the Common Object Request Broker Architecture. Sun Microsystems' Remote Method Invocation is a similar client/server interprogram protocol between programs written in Java.

An advantage of SOAP is that program calls are much more likely to get through firewall servers that screen out requests other than those for known applications (through the designated port mechanism). Since HTTP requests are usually allowed through firewalls, programs using SOAP to communicate can be sure that they can communicate with programs anywhere.

Multi-Purpose Internet Mail Extensions (MIME) is an extension of the original Internet e-mail protocol that lets people use the protocol to exchange different kinds of data files on the Internet: audio, video, images, application programs, and other kinds, as well as the ASCII handled in the original protocol, the Simple Mail Transport Protocol (SMTP). In 1991, Nathan Borenstein of Bellcore proposed to the IETF that SMTP be extended so that Internet (but mainly Web) client and server could recognize and handle other kinds of data than ASCII text. As a result, new file types were added to "mail" as a supported Internet Protocol file type.

Servers insert the MIME header at the beginning of any Web transmission. Clients use this header to select an appropriate "player" application for the type of data the header indicates. Some of these players are built into the Web client or browser (for example, all browser come with GIF and JPEG image players as well as the ability to handle HTML files); other players may need to be downloaded.

New MIME data types are registered with the Internet Assigned Numbers Authority (IANA).

MIME is specified in detail in Internet Request for Comments 1521 and 1522, which amend the original mail protocol specification, RFC 821 (the Simple Mail Transport Protocol) and the ASCII messaging header, RFC 822.

MQSeries is an IBM software family whose components are used to tie together other software applications so that they can work together. This type of application is often known as business integration software or middleware.

MQSeries consists of three products:
MQSeries Messaging, which provides the communication mechanism between applications on different platforms
MQSeries Integrator, which centralizes and applies business operations rules
MQSeries Workflow, which enables the capture, visualization, and automation of business processes The point of business integration is to connect different computer systems, diverse geographical locations, and dissimilar IT infrastructures so that a seamless operation can be run. IBM's MQSeries supplies communications between applications, or between users and a set of applications on dissimilar systems. It has grown in popularity as applications are made available over the Internet because of its support of over 35 platforms and its ability to integrate disparate automation systems.

An additional helpful feature is that its messaging scheme requires the application that receives the message to confirm receipt. If no confirmation materializes, the message is re-sent by the MQSeries.

Java Message Service (JMS) is an application program interface from Sun Microsystems 30 that supports the formal communication known as messaging between computers in a network. Sun's JMS provides a common interface to standard messaging protocols and also to special messaging services in support of Java programs.

The messages involved exchange crucial data between computers—rather than between users—and contain information such as event notification and service requests. Messaging is often used to coordinate programs in dissimilar systems or written in different programming languages.

Using the JMS interface, a programmer can invoke the messaging services of IBM's MQSeries, Progress Software's SonicMQ, and other popular messaging product vendors. In addition, JMS supports messages that contain serialized Java object and messages that contain Extensible Markup Language (XML) pages.

RosettaNet is an organization set up by leading information technology companies to define and implement a common set of standards for e-business. RosettaNet is defining a common parts dictionary so that different companies can define the same product the same way. It is also defining up to 100 e-business transaction processes and standardizing them. Because RosettaNet is supported by all or most of the major companies in the IT industry, its standards are expected to be widely adopted.

RosettaNet has developed a structured four-part approach for creating what it calls Partner Interface Processes (PIPs).
Business Process Modeling examines common business procedures and defines the components of the processes.
Business Process Analysis analyzes the processes and defines a target list of desirable changes to the processes.
PIP Development establishes guidelines and documentation for the changes.
Dictionaries consist of two data dictionary: a technical properties dictionary and a business properties dictionary. Along with the RosettaNet Implementation Framework (which defines an exchange protocol for PIP implementation), the dictionaries form the basis for PIP development.

Simple Mail Transfer Protocol (SMTP) is a TCP/IP protocol used in sending and receiving e-mail. However, since its limited in its ability to queue messages at the receiving end, its usually used with one of two other protocols, POP3 or Internet Message Access Protocol, that let the user save messages in a server mailbox and download them periodically from the server. In other words, users typically use a program that uses SMTP for sending e-mail and either POP3 or IMAP for receiving messages that have been received for them at their local server. Most mail programs such as Eudora let you specify both an SMTP server and a POP server. On UNIX-based systems, sendmail is the most widely-used SMTP server for e-mail. A commercial package, Sendmail, includes a POP3 server and also comes in a version for Windows NT.

SMTP usually is implemented to operate over Transmission Control Protocol port 25. The details of SMTP are in Request for Comments 821 of the Internet Engineering Task Force (IETF). An alternative to SMTP that is widely used in Europe is X400.

The Hypertext Transfer Protocol (HTTP) is the set of rules for exchanging files (text, graphic images, sound, video, and other multimedia files) on the World Wide Web. Relative to the TCP/IP suite of protocols (which are the basis for information exchange on the Internet), HTTP is an application protocol.

Essential concepts that are part of HTTP include (as its name implies) the idea that files can contain references to other files whose selection will elicit additional transfer requests. Any Web server machine contains, in addition to the HTML and other files it can serve, an HTTP daemon, a program that is designed to wait for HTTP requests and handle them when they arrive. Your Web browser is an HTTP client, sending requests to server machines. When the browser user enters file requests by either "opening" a Web file (typing in a URL) or clicking on a hypertext link, the browser builds an HTTP request and sends it to the Internet Protocol address indicated by the URL. The HTTP daemon in the destination server machine receives the request and, after any necessary processing, the requested file is returned.

An embodiment of the present invention may also be written using JAVA, C, and the C++ language and utilize object oriented programming methodology. Object oriented programming (OOP) has become increasingly used to develop complex applications. As OOP moves toward the mainstream of software design and development, various software solutions require adaptation to make use of the benefits of OOP. A need exists for these principles of OOP to be applied to a messaging interface of an electronic messaging system such that a set of OOP classes and objects for the messaging interface can be provided.

OOP is a process of developing computer software using objects, including the steps of analyzing the problem, designing the system, and constructing the program. An object is a software package that contains both data and a collection of related structures and procedures. Since it contains both data and a collection of structures and procedures, it can be visualized as a self-sufficient component that does not require other additional structures, procedures or data to perform its specific task. OOP, therefore, views a computer program as a collection of largely autonomous components, called objects, each of which is responsible for a specific task. This concept of packaging data, structures, and procedures together in one component or module is called encapsulation.

In general, OOP components are reusable software modules which present an interface that conforms to an object model and which are accessed at run-time through a component integration architecture. A component integration architecture is a set of architecture mechanisms which allow software modules in different process spaces to utilize each others capabilities or functions. This is generally done by assuming a common component object model on which to build the architecture. It is worthwhile to differentiate between an object and a class of objects at this point. An object is a single instance of the class of objects, which is often just called a class. A class of objects can be viewed as a blueprint, from which many objects can be formed.

OOP allows the programmer to create an object that is a part of another object. For example, the object representing a piston engine is said to have a composition-relationship with the object representing a piston. In reality, a piston engine comprises a piston, valves and many other components; the fact that a piston is an element of a piston engine can be logically and semantically represented in OOP by two objects.

OOP also allows creation of an object that "depends from" another object. If there are two objects, one representing a piston engine and the other representing a piston engine wherein the piston is made of ceramic, then the relationship between the two objects is not that of composition. A ceramic piston engine does not make up a piston engine. Rather it is merely one kind of piston engine that has one more limitation than the piston engine; its piston is made of ceramic. In this case, the object representing the ceramic piston engine is called a derived object, and it inherits all of the aspects of the object representing the piston engine and adds further limitation or detail to it. The object representing the ceramic piston engine "depends from" the object representing the piston engine. The relationship between these objects is called inheritance.

When the object or class representing the ceramic piston engine inherits all of the aspects of the objects representing the piston engine, it inherits the thermal characteristics of a standard piston defined in the piston engine class. However, the ceramic piston engine object overrides these ceramic specific thermal characteristics, which are typically different from those associated with a metal piston. It skips over the original and uses new functions related to ceramic pistons. Different kinds of piston engines have different characteristics, but may have the same underlying functions associated with it (e.g., how many pistons in the engine, ignition sequences, lubrication, etc.). To access each of these functions in any piston engine object, a programmer would call the same functions with the same names, but each type of piston engine may have different/overriding implementations of functions behind the same name. This ability to hide different implementations of a function behind the same name is called polymorphism and it greatly simplifies communication among objects.

With the concepts of composition-relationship, encapsulation, inheritance and polymorphism, an object can represent just about anything in the real world. In fact, one's logical perception of the reality is the only limit on determining the kinds of things that can become objects in object-oriented software. Some typical categories are as follows:

Objects can represent physical objects, such as automobiles in a traffic-flow simulation, electrical components in a circuit-design program, countries in an economics model, or aircraft in an air-traffic-control system.

Objects can represent elements of the computer-user environment such as windows, menus or graphics objects.

An object can represent an inventory, such as a personnel file or a table of the latitudes and longitudes of cities.

An object can represent user-defined data types such as time, angles, and complex numbers, or points on the plane.

With this enormous capability of an object to represent just about any logically separable matters, OOP allows the software developer to design and implement a computer program that is a model of some aspects of reality, whether that reality is a physical entity, a process, a system, or a composition of matter. Since the object can represent anything, the software developer can create an object which can be used as a component in a larger software project in the future.

If 90% of a new OOP software program consists of proven, existing components made from preexisting reusable objects, then only the remaining 10% of the new software project has to be written and tested from scratch. Since 90% already came from an inventory of extensively tested reusable objects, the potential domain from which an error could originate is 10% of the program. As a result, OOP enables software developers to build objects out of other, previously built objects.

This process closely resembles complex machinery being built out of assemblies and sub-assemblies. OOP technology, therefore, makes software engineering more like hardware engineering in that software is built from existing components, which are available to the developer as objects. All this adds up to an improved quality of the software as well as an increased speed of its development.

Programming languages are beginning to fully support the OOP principles, such as encapsulation, inheritance, polymorphism, and composition-relationship. With the advent of the C++ language, many commercial software developers have embraced OOP. C++ is an OOP language that offers a fast, machine-executable code. Furthermore, C++ is suitable for both commercial-application and systems-programming projects. For now, C++ appears to be the most popular choice among many OOP programmers, but there is a host of other OOP languages, such as Smalltalk, Common Lisp Object System (CLOS), and Eiffel. Additionally, OOP capabilities are being added to more traditional popular computer programming languages such as Pascal.

The benefits of object classes can be summarized, as follows:

Objects and their corresponding classes break down complex programming problems into many smaller, simpler problems.

Encapsulation enforces data abstraction through the organization of data into small, independent objects that can communicate with each other. Encapsulation protects the data in an object from accidental damage, but allows other objects to interact with that data by calling the object's member functions and structures.

Subclassing and inheritance make it possible to extend and modify objects through deriving new kinds of objects from the standard classes available in the system. Thus, new capabilities are created without having to start from scratch.

Polymorphism and multiple inheritance make it possible for different programmers to mix and match characteristics of many different classes and create specialized objects that can still work with related objects in predictable ways.

Class hierarchies and containment hierarchies provide a flexible mechanism for modeling real-world objects and the relationships among them.

Libraries of reusable classes are useful in many situations, but they also have some limitations. For example:

Complexity: In a complex system, the class hierarchies for related classes can become extremely confusing, with many dozens or even hundreds of classes.

Flow of control. A program written with the aid of class libraries is still responsible for the flow of control (i.e., it must control the interactions among all the objects created from a particular library). The programmer has to decide which functions to call at what times for which kinds of objects.

Duplication of effort. Although class libraries allow programmers to use and reuse many small pieces of code, each programmer puts those pieces together in a different way. Two different programmers can use the same set of class libraries to write two programs that do exactly the same thing but whose internal structure (i.e., design) may be quite different, depending on hundreds of small decisions each programmer makes along the way. Inevitably, similar pieces of code end up doing similar things in slightly different ways and do not work as well together as they should.

Class libraries are very flexible. As programs grow more complex, more programmers are forced to reinvent basic solutions to basic problems over and over again. A relatively new extension of the class library concept is to have a framework of class libraries. This framework is more complex and consists of significant collections of collaborating classes that capture both the small scale patterns and major mechanisms that implement the common requirements and design in a specific application domain. They were first developed to free application programmers from the chores involved in displaying menus, windows, dialog boxes, and other standard user interface elements for personal computers.

Frameworks also represent a change in the way programmers think about the interaction between the code they write and code written by others. In the early days of procedural programming, the programmer called libraries provided by the operating system to perform certain tasks, but basically the program executed down the page from start to finish, and the programmer was solely responsible for the flow of control. This was appropriate for printing out paychecks, calculating a mathematical table, or solving other problems with a program that executed in just one way.

The development of graphical user interfaces began to turn this procedural programming arrangement inside out. These interfaces allow the user, rather than program logic, to drive the program and decide when certain actions should be performed. Today, most personal computer software accomplishes this by means of an event loop which monitors the mouse, keyboard, and other sources of external events and calls the appropriate parts of the programmer's code according to actions that the user performs. The programmer no longer determines the order in which events occur. Instead, a program is divided into separate pieces that are called at unpredictable times and in an unpredictable order. By relinquishing control in this way to users, the developer creates a program that is much easier to use. Nevertheless, individual pieces of the program written by the developer still call libraries provided by the operating system to accomplish certain tasks, and the programmer must still determine the flow of control within each piece after it's called by the event loop. Application code still "sits on top of" the system.

Even event loop programs require programmers to write a lot of code that should not need to be written separately for every application. The concept of an application framework carries the event loop concept further. Instead of dealing with all the nuts and bolts of constructing basic menus, windows, and dialog boxes and then making these things all work together, programmers using application frameworks start with working application code and basic user interface elements in place. Subsequently, they build from there by replacing some of the generic capabilities of the framework with the specific capabilities of the intended application.

Application frameworks reduce the total amount of code that a programmer has to write from scratch. However, because the framework is really a generic application that displays windows, supports copy and paste, and so on, the programmer can also relinquish control to a greater degree than event loop programs permit. The framework code takes care of almost all event handling and flow of control, and the programmer's code is called only when the framework needs it (e.g., to create or manipulate a proprietary data structure).

A programmer writing a framework program not only relinquishes control to the user is also true for event loop programs), but also relinquishes the detailed flow of control within the program to the framework. This approach allows the creation of more complex systems that work together in interesting ways, as opposed to isolated programs, having custom code, being created over and over again for similar problems.

Thus, as is explained above, a framework basically is a collection of cooperating classes that make up a reusable design solution for a given problem domain. It typically includes objects that provide default behavior (e.g., for menus and windows), and programmers use it by inheriting some of that default behavior and overriding other behavior so that the framework calls application code at the appropriate times.

There are three main differences between frameworks and class libraries:
  Behavior versus protocol. Class libraries are essentially collections of behaviors that you can call when you want those individual behaviors in your program. A framework, on the other hand, provides not only behavior but also the protocol or set of rules that govern the ways in which behaviors can be combined, including rules for what a programmer is supposed to provide versus what the framework provides.
  Call versus override. With a class library, the code the programmer instantiates objects and calls their member functions. It's possible to instantiate and call objects in the same way with a framework (i.e., to treat the framework as a class library), but to take full advantage of a framework's reusable design, a programmer typically writes code that overrides and is called by the framework. The framework manages the flow of control among its objects. Writing a program involves dividing responsibilities among the various pieces of software that are called by the framework rather than specifying how the different pieces should work together.
  Implementation versus design. With class libraries, programmers reuse only implementations, whereas with frameworks, they reuse design. A framework embodies the way a family of related programs or pieces of software work. It represents a generic design solution that can be adapted to a variety of specific problems in a given domain: For example, a single framework can embody the way a user interface works, even though two different user interfaces created with the same framework might solve quite different interface problems.

Thus, through the development of frameworks for solutions to various problems and programming tasks, significant reductions in the design and development effort for software can be achieved. A preferred embodiment of the invention utilizes HyperText Markup Language (HTML) to implement documents on the Internet together with a general-purpose secure communication protocol for a transport medium between the client and the server. HTTP or other protocols could be readily substituted for HTML without undue experimentation. Information on these products is available in T. Berners-Lee, D. Connoly, "RFC 1866: Hypertext Markup Language—2.0" (November 1995); and R. Fielding, H, Frystyk, T. Berners-Lee, J. Gettys and J. C. Mogul, "Hypertext Transfer Protocol—HTTP/1.1: HTTP Working Group Internet Draft" (May 2, 1996). HTML is a simple data format used to create hypertext documents that are portable from one platform to another. HTML documents are SGML documents with generic semantics that are appropriate for representing information from a wide range of domains. HTML has been in use by the World-Wide Web global information initiative since 1990. HTML is an application of ISO Standard 8879; 1986 Information Processing Text and Office Systems; Standard Generalized Markup Language (SGML).

To date, Web development tools have been limited in their ability to create dynamic Web applications which span from client to server and interoperate with existing computing resources. Until recently, HTML has been the dominant technology used in development of Web-based solutions. However, HTML has proven to be inadequate in the following areas:
  Poor performance;
  Restricted user interface capabilities;
  Can only produce static Web pages;
  Lack of interoperability with existing applications and data; and
  Inability to scale.

Sun Microsystems's Java language solves many of the client-side problems by:
  Improving performance on the client side;
  Enabling the creation of dynamic, real-time Web applications; and
  Providing the ability to create a wide variety of user interface components.

With Java, developers can create robust User Interface (UI) components. Custom "widgets" (e.g., real-time stock tickers, animated icons, etc.) can be created, and client-side performance is improved. Unlike HTML, Java supports the notion of client-side validation, offloading appropriate processing onto the client for improved performance. Dynamic, real-time Web pages can be created. Using the above-mentioned custom UI components, dynamic Web pages can also be created.

Sun's Java language has emerged as an industry-recognized language for "programming the Internet". Sun defines Java as: "a simple, object-oriented, distributed, interpreted, robust, secure, architecture-neutral, portable, high-performance, multithreaded, dynamic, buzzword-compliant, general-purpose programming language. Java supports programming for the Internet in the form of platform-independent Java applets". Java applets are small, specialized applications that comply with Sun's Java Application Programming Interface (API) allowing developers to add "interactive content" to Web documents (e.g., simple animations, page adornments, basic games, etc.). Applets execute within a Java-compatible browser (e.g., Netscape Navigator) by copying code from the server to client. From a language standpoint, Java's core feature set is based on C++. Sun's Java literature states that Java is basically, "C++ with extensions from Objective C for more dynamic method resolution".

Another technology that provides similar function to JAVA is provided by Microsoft and ActiveX Technologies, to give developers and Web designers wherewithal to build dynamic content for the Internet and personal computers. ActiveX includes tools for developing animation, 3-D virtual reality, video and other multimedia content. The tools use Internet standards, work on multiple platforms, and are being supported by over 100 companies. The group's building blocks are called ActiveX Controls, small, fast components that enable developers to embed parts of software in hypertext markup language (HTML) pages. ActiveX Controls work with a variety of programming languages including Microsoft Visual C++, Borland Delphi, Microsoft Visual Basic programming system and, in the future, Microsoft's development tool for Java, code named "Jakarta". ActiveX Technologies also includes ActiveX Server Framework, allowing developers to create server applications. One of ordinary skill in the art readily recognizes that ActiveX could be substituted for JAVA without undue experimentation to practice the invention.

Based on the foregoing specification, the invention may be implemented using computer programming or engineering techniques including computer software, firmware, hardware or any combination or subset thereof. Any such resulting program, having computer-readable code means, may be embodied or provided within one or more computer-readable media, thereby making a computer program product, i.e., an article of manufacture, according to the invention. The computer readable media may be, for instance, storage media including a fixed (hard) drive, diskette, optical disk, magnetic tape, semiconductor memory such as read-only memory (ROM), etc.; or any transmitting/receiving medium such as the Internet or other communication network or link. The article of manufacture containing the computer code may be made and/or used by executing the code directly from one medium, by copying the code from one medium to another medium, or by transmitting the code over a network.

One skilled in the art of computer science will easily be able to combine the software created as described with appropriate general purpose or special purpose computer hardware to create a computer system or computer sub-system embodying the method of the invention.

While various embodiments have been described above, it should be understood that they have been presented by way of example only, and not limitation. Thus, the breadth and scope of a preferred embodiment should not be limited by any of the above described exemplary embodiments, but should be defined only in accordance with the following claims and their equivalents.

What is claimed:

1. A computer implemented method, comprising:
    capturing messages in a message stream transmitted via a network between an enterprise and at least one trading partner, the message being captured proximal to a portion of the network associated with the enterprise utilizing a network device coupled to the network;
    extracting structured data from top-level content in the captured messages indicating semantic relationships contained in the captured messages, the structured data being extracted utilizing data extractor residing on the network device, the extracted data being passed to a data store of a processing component residing on a second device in communication with the network device;
    processing the extracted data at the second device to conform to a local data model indicating one or more of the semantic relationships of an individual captured message and to conform to a global data model indicating one or more of the semantic relationships between a plurality of the captured messages, the processing to conform to the global data model including performing a dependency analysis on at least one variable based on the semantic relationships and building an approximation of an analytic PDF, the individual captured message comprising a local data event and the plurality of captured messages having at least one global event associated therewith, wherein a dependency matrix builder resides on the second device performs the processing, wherein the dependency analysis includes analyzing variables traversing a configurable number of hops;
    analyzing the processed data to identify a pattern corresponding to an event; and
    detecting the pattern in subsequently captured messages to identify a subsequent occurrence of the event.

2. The method of claim 1, wherein the structured data is in an extensible markup language format.

3. The method of claim 1, wherein the local and global data models comprise data cubes.

4. The method of claim 1, wherein the messages are captured at an edge of an enterprise network.

5. The method of claim 1, wherein the event is derived from the local data model.

6. The method of claim 5, wherein the pattern is detected in real time.

7. The method of claim 1, wherein the analyzing of the processed data to identify a pattern corresponding to an event includes applying at least one statistical modeling technique to the processed data.

8. The method of claim 7, wherein the applied statistical modeling techniques is selected dynamically.

9. The method of claim 1, wherein the processed data is stored in the data store.

10. The method of claim 1, further comprising exporting the identified event via the network.

11. The method of claim 10, wherein a user is permitted to select at least one location connected to the network to which the identified event is exported.

12. A computer system, comprising:
    a filter residing on a network device coupled to a network that captures messages in a message stream transmitted via the network between an enterprise and at least one trading partner, the filter capturing messages proximal to a portion of the network associated with the enterprise;
    a data extractor residing on the network device that extracts structured data from top-level content in the captured messages, the structured data indicating semantic relationships contained in the captured messages, the extracted data being passed to a data store of a processing component residing on a second device in communication with the network device;
    a local builder residing on the second device that processes the extracted data to conform to a local data model indicating one or more of the semantic relationships of an individual captured message, the individual captured message comprising a local data event;
    a global builder residing on the second device that processes the extracted data to conform to a global data model indicating one or more of the semantic relationships between a plurality of the captured messages, the plurality of captured messages having at least one global event associated therewith, the global builder having a dependency builder that performs a dependency analysis on at least one variable based on the semantic relationships and an approximator that builds an approximation of an analytic PDF, wherein the dependency analysis includes analyzing variables traversing a configurable number of hops;
    an analysis framework that analyzes the processed data to identify a pattern corresponding to an event; and a detector that detects the pattern in subsequently captured messages to identify a subsequent occurrence of the event.

13. The system of claim 12, wherein the structured data is in an extensible markup language format.

14. The system of claim 12, wherein the data model comprises a data cube.

15. The system of claim 12, wherein the event comprises a local event derived from the local data model.

16. An article of manufacture comprising a non-transitory computer readable physical storage medium having computer code capable of being read by a computer for causing the computer to perform a method comprising:

capturing messages in a message stream transmitted via a network between an enterprise and at least one trading partner, the message being captured proximal to a portion of the network associated with the enterprise utilizing a network device coupled to the network;

extracting structured data from top-level content in the captured messages indicating semantic relationships contained in the captured messages, the structured data being extracted utilizing data extractor residing on the network device, the extracted data being passed to a data store of a processing component residing on a second device in communication with the network device;

processing the extracted data at the second device to conform to a local data model indicating one or more of the semantic relationships of an individual captured message and to conform to a global data model indicating one or more of the semantic relationships between a plurality of the captured messages, the processing to conform to the global data model including performing a dependency analysis on at least one variable based on the semantic relationships and building an approximation of an analytic PDF, the individual captured message comprising a local data event and the plurality of captured messages having at least one global event associated therewith, wherein the dependency analysis includes analyzing variables traversing a configurable number of hops;

analyzing the processed data to identify a pattern corresponding to an event;

detecting the pattern in subsequently captured messages to identify a subsequent occurrence of the event.

17. The article of manufacture of claim 16, wherein the structured data is in an extensible markup language format.

* * * * *